Aug. 6, 1940.                G. S. CALDWELL                2,210,360
             DEVICE FOR HOLDING FRAMES WHILE MOUNTING LENSES
                           Filed June 23, 1938
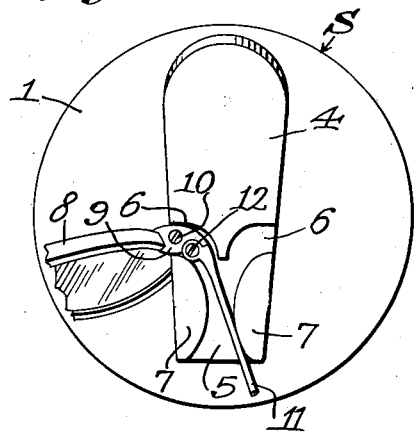
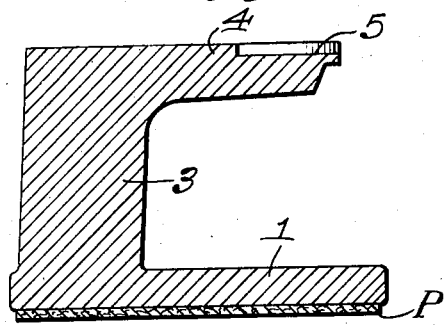
Inventor
Guy S. Caldwell, deceased,
By Evelyn D. Caldwell,
  Independent Executrix.
By C.A.Snow & Co.
              Attorneys.

UNITED STATES PATENT OFFICE 2,210,360

DEVICE FOR HOLDING FRAMES WHILE MOUNTING LENSES

Guy S. Caldwell, deceased, late of Paris, Tex., by Evelyn D. Caldwell, independent executrix, Paris, Tex.

Application June 23, 1938, Serial No. 215,464

1 Claim. (Cl. 81—3.5)

This invention aims to provide a simple device upon which a pair of spectacles may be retained and supported conveniently whilst a spectacle temple is being joined by a screw or the like to an ear on the spectacle frame.

In the accompanying drawing:

Fig. 1 shows in top plan, a device constructed in accordance with the invention;

Fig. 2 is a vertical section.

The device comprises a table 4 which is of considerably greater length than breadth and may taper slightly.

In the outer end of the table 4, midway between the longitudinal edges of the table, there is a longitudinal slot 5 extended part way through the table. The slot 5 has oppositely projecting lateral branches 6 opening through the outer longitudinal edges of the table 4. The slot 5 is of least width intermediate its ends and forms, in the table 4, lugs 7 which have inner edges that are convexed toward each other.

The numeral 8 marks the frame of a pair of spectacles having ears 9 which are joined together by a securing element such as a screw 10. A temple 11 is connected to the ears 9 by a pivot screw 12.

The ears 9 are placed in one of the branches 6 of the slot 5, and the temple 11 extends out of the mouth of the slot, in contact with one of the lugs 7. The frame 8 and the temple 11 are so supported on the table 4 that the screws 10 and 12 may be inserted conveniently. When the opposite end of a pair of spectacles is to be worked upon, the branch 6 which is shown empty in Fig. 1 comes into play.

The table 4 is carried by a standard 3, upstanding from a base 1, the table being disposed in vertically-spaced relation to the base. A resilient protecting pad P is secured to the lower surface of the base 1. The lower surface of the slot 5 and of the branches 6 are in the same plane and form a support for the ear 9 and the temple 11.

Having thus described the invention, what is claimed is:

A device for supporting a spectacle frame including an ear and an associated temple, whilst a connecting device is being assembled with the frame at the place where the temple is joined to the ear, comprising a base, a standard on the base, a table carried by the standard in vertically spaced relation to the base and provided at one end with a longitudinal slot extended part way through the table and located approximately midway between the opposite outer edges of the table, the slot having oppositely-projecting branches which open through said edges of the table, the slot being of least width intermediate its ends and forming oppositely-disposed lugs which have their inner edges convexed toward each other, the branches, respectively, being shaped for the reception of the ears at opposite ends of a spectacle frame, the lower surface of the slot and of the branches being in the same plane and forming a support for said ear and temple, the lug at one side of the slot forming a temple-abutment when the corresponding ear is received in the branch located at the opposite side of the slot.

EVELYN D. CALDWELL,
Independent Executrix of the Estate of Guy S. Caldwell, Deceased.